(12) United States Patent
Havewala et al.

(10) Patent No.: US 7,877,424 B2
(45) Date of Patent: Jan. 25, 2011

(54) QUOTA ENFORCEMENT WITH TRANSACTED FILE SYSTEMS

(75) Inventors: Sarosh Cyrus Havewala, Kirkland, WA (US); Hui Li, Redmond, WA (US); Neal R Christiansen, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 359 days.

(21) Appl. No.: 11/852,352

(22) Filed: Sep. 10, 2007

(65) Prior Publication Data

US 2008/0243963 A1    Oct. 2, 2008

Related U.S. Application Data

(60) Provisional application No. 60/921,016, filed on Mar. 30, 2007.

(51) Int. Cl.
*G06F 17/30* (2006.01)
(52) U.S. Cl. ...................................... 707/826
(58) Field of Classification Search ................... 707/826
See application file for complete search history.

(56) References Cited

U.S. PATENT DOCUMENTS

| 5,713,013 | A | * | 1/1998 | Black ............................ 707/2 |
| 5,987,477 | A | * | 11/1999 | Schmuck et al. ............. 707/201 |
| 6,092,163 | A | * | 7/2000 | Kyler et al. .................. 711/163 |
| 7,487,228 | B1 | * | 2/2009 | Preslan et al. ................ 709/219 |
| 2005/0021487 | A1 | * | 1/2005 | Verma et al. ..................... 707/1 |
| 2005/0066134 | A1 | * | 3/2005 | Tormasov et al. ........... 711/151 |
| 2006/0117070 | A1 | | 6/2006 | Thind et al. |
| 2006/0117135 | A1 | | 6/2006 | Thind et al. |

* cited by examiner

*Primary Examiner*—Neveen Abel Jalil
*Assistant Examiner*—Kevin Young

(57) ABSTRACT

Aspects of the subject matter described herein relate enforcing quotas in transactional file systems. In aspects, a filter monitors operations that may affect quota usage/charge of a file system object having a quota allotment. In doing so, the filter determines a quota value outside of any transaction for the object and a quota value associated with at least one transaction affecting the object. The filter receives a request that involves the use of additional quota. The filter then determines whether to allow or fail the request depending on whether enough quota is available to satisfy the request.

15 Claims, 7 Drawing Sheets

US 7,877,424 B2

QUOTA ENFORCEMENT WITH TRANSACTED FILE SYSTEMS

CROSS REFERENCE TO RELATED APPLICATION

This application claims the benefit of U.S. Provisional Application No. 60/921,016, filed Mar. 30, 2007, entitled QUOTA ENFORCEMENT WITH TRANSACTED FILE SYSTEMS, which application is incorporated herein in its entirety.

BACKGROUND

Disk capacity continues to increase at a phenomenal rate. At the same time, however, managing the disk space, especially for disks that may be used by more than one user, is becoming more troublesome. Even though disk capacity has increased greatly, it is still finite and may be consumed prematurely or by a small number of users if mismanaged. Thus, administrators and the like are left with the task of determining how much disk space each user is allowed to consume and what to do if a user attempts to exceed the user's disk space. Enforcing quotas of disk space is complicated by transaction-capable file systems.

SUMMARY

Briefly, aspects of the subject matter described herein relate enforcing quotas in transactional file systems. In aspects, a filter monitors operations that may affect quota usage/charge of a file system object having a quota allotment.

In doing so, the filter determines a quota value outside of any transaction for the object and a number of quota values associated with transactions affecting the object. The filter receives a request that involves the use of additional quota. The filter then determines whether to allow or fail the request depending on whether enough quota is available to satisfy the request.

This Summary is provided to briefly identify some aspects of the subject matter that is further described below in the Detailed Description. This Summary is not intended to identify key or essential features of the claimed subject matter, nor is it intended to be used to limit the scope of the claimed subject matter.

The phrase "subject matter described herein" refers to subject matter described in the Detailed Description unless the context clearly indicates otherwise. The term "aspects" is to be read as "at least one aspect." Identifying aspects of the subject matter described in the Detailed Description is not intended to identify key or essential features of the claimed subject matter.

The aspects described above and other aspects of the subject matter described herein are illustrated by way of example and not limited in the accompanying figures in which like reference numerals indicate similar elements and in which:

DETAILED DESCRIPTION

Exemplary Operating Environment

Figure 1:
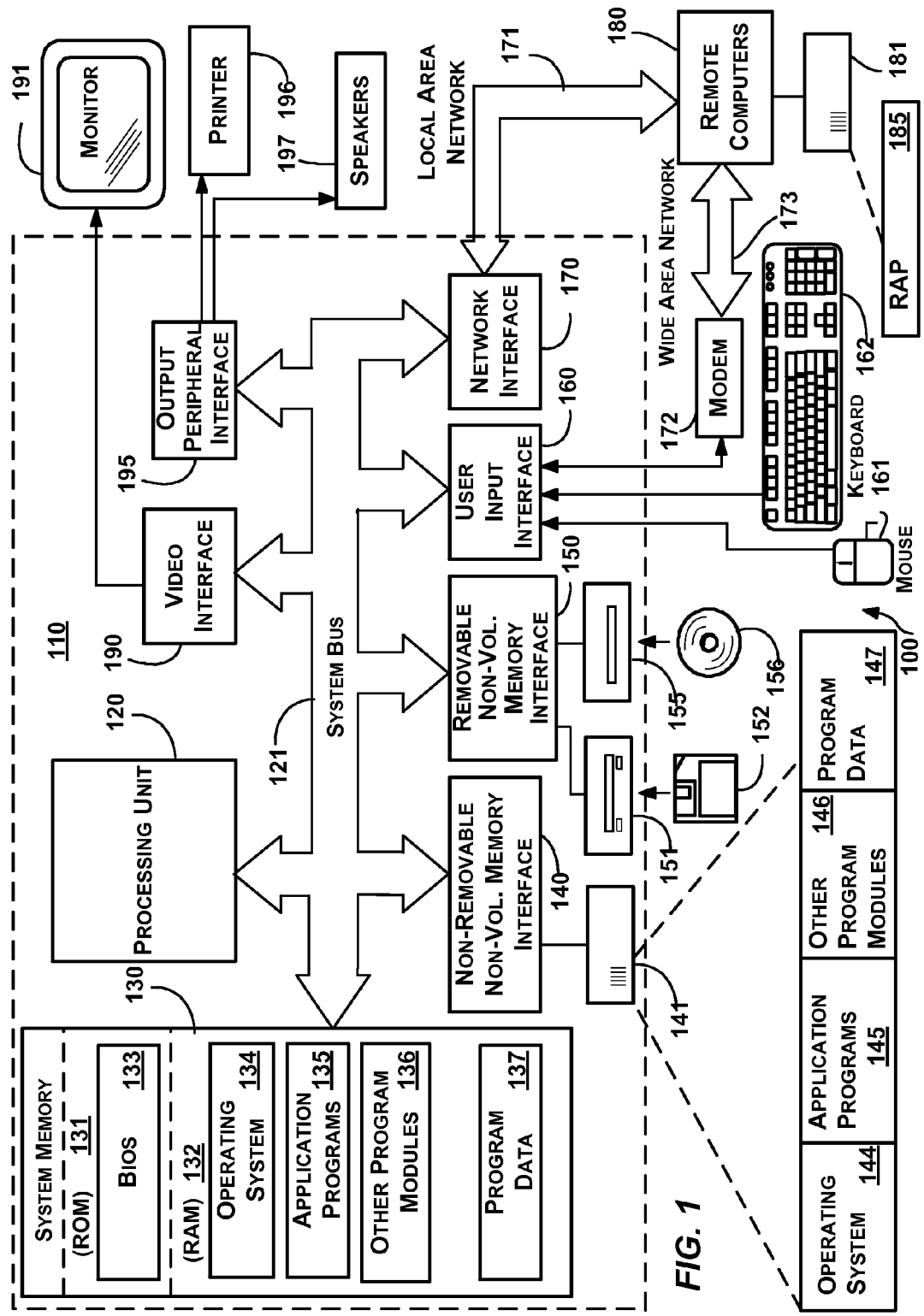
FIG. 1 is a block diagram representing an exemplary general-purpose computing environment into which aspects of the subject matter described herein may be incorporated.

FIG. 1 illustrates an example of a suitable computing system environment 100 on which aspects of the subject matter described herein may be implemented. The computing system environment 100 is only one example of a suitable computing environment and is not intended to suggest any limitation as to the scope of use or functionality of aspects of the subject matter described herein. Neither should the computing environment 100 be interpreted as having any dependency or requirement relating to any one or combination of components illustrated in the exemplary operating environment 100.

Aspects of the subject matter described herein are operational with numerous other general purpose or special purpose computing system environments or configurations. Examples of well known computing systems, environments, and/or configurations that may be suitable for use with aspects of the subject matter described herein include, but are not limited to, personal computers, server computers, handheld or laptop devices, multiprocessor systems, microcontroller-based systems, set top boxes, programmable consumer electronics, network PCs, minicomputers, mainframe computers, distributed computing environments that include any of the above systems or devices, and the like.

Aspects of the subject matter described herein may be described in the general context of computer-executable instructions, such as program modules, being executed by a computer. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing aspects of the subject matter described herein includes a general-purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile discs (DVDs) or other optical disk storage, magnetic cassettes, magnetic tape, magnetic disk storage or other magnetic storage devices, or any other medium which can be used to store the desired information and which can be accessed by the computer 110. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disc drive 155 that reads from or writes to a removable, nonvolatile optical disc 156 such as a CD ROM or other optical media. Other removable/non-removable, volatile/nonvolatile computer storage media that can be used in the exemplary operating environment include, but are not limited to, magnetic tape cassettes, flash memory cards, digital versatile discs, digital video tape, solid state RAM, solid state ROM, and the like. The hard disk drive 141 is typically connected to the system bus 121 through a non-removable memory interface such as interface 140, and magnetic disk drive 151 and optical disc drive 155 are typically connected to the system bus 121 by a removable memory interface, such as interface 150.

The drives and their associated computer storage media, discussed above and illustrated in FIG. 1, provide storage of computer-readable instructions, data structures, program modules, and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, a touch-sensitive screen of a handheld PC or other writing tablet, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Filters

With contemporary operating systems, such as Microsoft Corporation's Windows® Vista operating system with an underlying file system such as the Windows® NTFS (Windows® NT File System), FAT, CDFS, SMB redirector file system, or WebDav file systems, one or more file system filter drivers may be inserted between the I/O manager that receives user I/O requests and the file system driver. In general, filter drivers (sometimes referred to herein simply as "filters") are processes that enhance the underlying file system by performing various file-related computing tasks that users desire, including tasks such as passing file system I/O (requests and data) through anti-virus software, file system quota monitors, file replicators, and encryption/compression products.

For example, antivirus products provide a filter that watches I/O to and from certain file types (.exe, .doc, and the like) looking for virus signatures, while file replication products perform file system-level mirroring. Other types of file system filter drivers are directed to system restoration (which backs up system files when changes are about to be made so that the user can return to the original state), disk quota enforcement, backup of open files, undeletion of deleted files, encryption of files, and so forth. Thus, by installing file system filter drivers, computer users can select the file system features they want and need, in a manner that enables upgrades, replacement, insertion, and removal of the components without changing the actual operating system or file system driver code.

The term "process" and its variants as used herein may include one or more traditional processes, threads, components, libraries, objects that perform tasks, and the like. A process may be implemented in hardware, software, or a combination of hardware and software. In an embodiment, a process is any mechanism, however called, capable of or used in performing an action. A process may be distributed over multiple devices or a single device. In one embodiment, an entity comprises a process as defined above. In another embodiment, an entity comprises any one or more objects that is/are capable of performing actions associated with or using or one or more processes.

Figure 2:
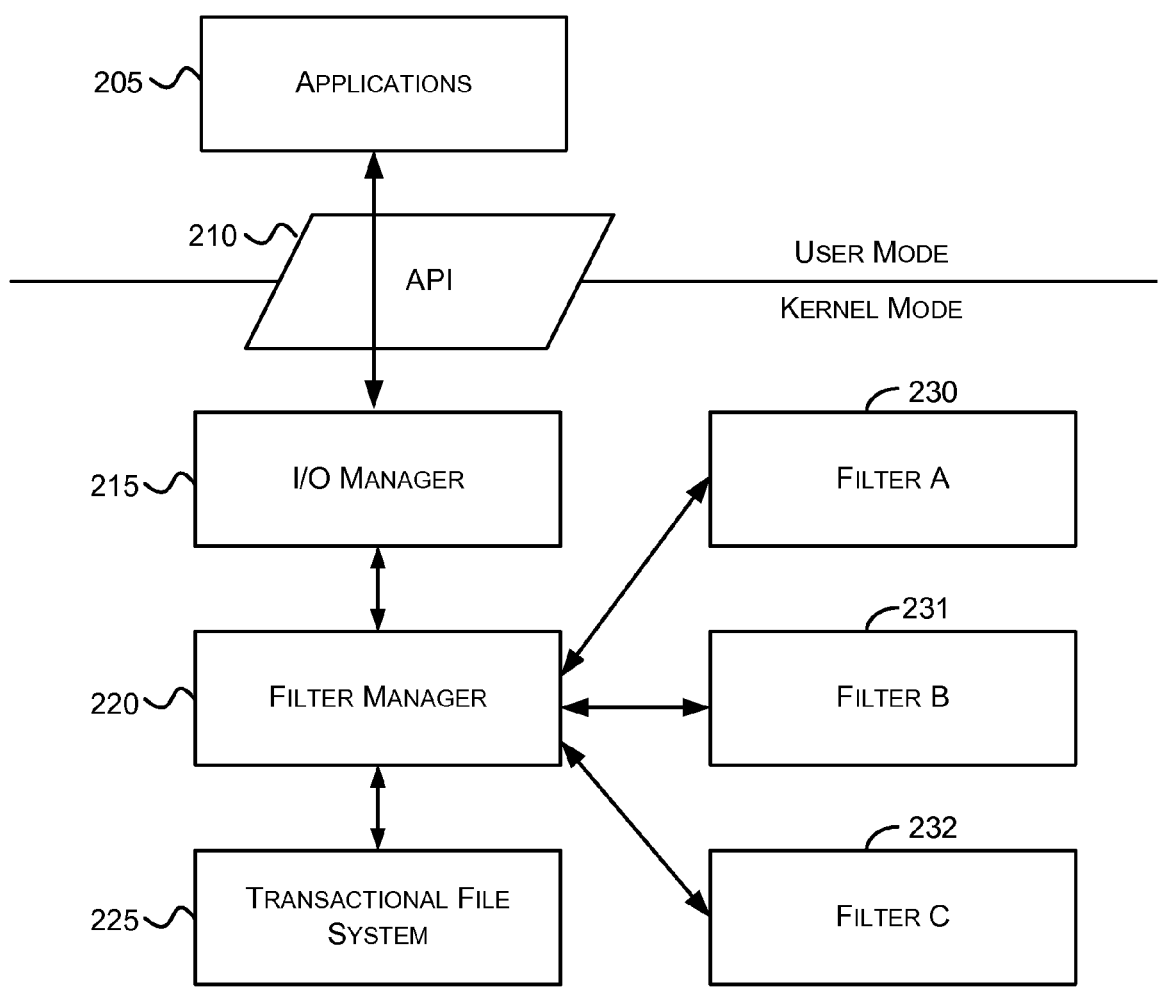
FIG. 2 is a block diagram representing an exemplary arrangement of components of a system that may operate in accordance with aspects of the subject matter described herein.

FIG. 2 is a block diagram representing an exemplary arrangement of components of a system that may operate in accordance with aspects of the subject matter described herein. The components include one or more applications 205, an applications programming interface (API) 210, an input/output (I/O) manager 215, a filter manger 220, a transactional file system 225, and one or more filters 230-232.

The applications 205 may make file system requests (e.g., via function/method calls) through the API 210 to the I/O manager 215. The I/O manager 215 may determine what I/O request or requests should be issued to fulfill each request and send each I/O request to the filter manager 220. The I/O manager 215 may also return data to the applications 205 as operations associated with the file system requests proceed, complete, or abort.

In one implementation, filters comprise objects or the like that when instantiated register (e.g., during their initialization procedure) with a registration mechanism in the filter manager 220. For efficiency, a filter may register for file system requests in which it may be interested in processing. To this end, as part of registration, each filter notifies the filter manager 220 of the types of I/O requests in which it is interested (e.g., create, read, write, close, rename, and so forth). For example, an encryption filter may register for read and write I/Os, but not for others wherein data does not need to be encrypted or decrypted. Similarly, a quota filter may be interested only in object creates, object deletes, object writes, and other operations that may cause on-disk allocation change of a file.

In addition to specifying the types of I/O requests in which it is interested, a filter may further specify whether the filter should be notified for pre-callbacks and post-callbacks for each of the types of I/O. A pre-callback is called as data associated with an I/O request propagates from the I/O manager 215 towards the transactional file system 225, while a post-callback is called during the completion of the I/O request as data associated with the I/O request propagates from the transactional file system 225 towards the I/O manager 215.

From each I/O request, the filter manager 220 may create a data structure in a uniform format suitable for use by the filters 230-232. Hereinafter, this data structure is sometimes referred to as callback data. The filter manager 220 may then call and pass the callback data to each filter that has registered to receive callbacks for the type of I/O received by the filter manager 220. Any filters registered to receive callbacks for the type of I/Os received by the filter manager are sometimes referred to as mini filters.

Typically, the filter manager 220 passes callback data associated with a particular type of I/O request to each registered filter sequentially in an order in which the registered filters are ordered. For example, if the filters 230 and 232 are registered to receive callbacks for all read I/O requests and are ordered such that the filter 230 is before the filter 232 in processing such requests, then after receiving a read I/O, the filter manager 220 may first call and pass the callback data to the filter 230 and after the filter 230 has processed the callback data, the filter manager 220 may then call and pass the callback data (as modified, if at all) to the filter 232.

A filter may be attached to one or more volumes. That is, a filter may be registered to be called and receive callback data for I/Os related to only one or more than one volumes.

A filter may generate its own I/O request which may then be passed to other filters. For example, an anti-virus filter may wish to read a file before it is opened. A filter may stop an I/O request from propagating further and may instruct the filter manager to report a status code (e.g., success or failure) for the I/O request. A filter may store data in memory and persist this data on disk. In general, a filter may be created to perform any set of actions that may be performed by a kernel-mode or user-mode process and may be reactive (e.g., wait until it receives I/O requests before acting) and/or proactive (e.g., initiate its own I/O requests or perform other actions asynchronously with I/O requests handled by the I/O manager 215).

Figure 3:
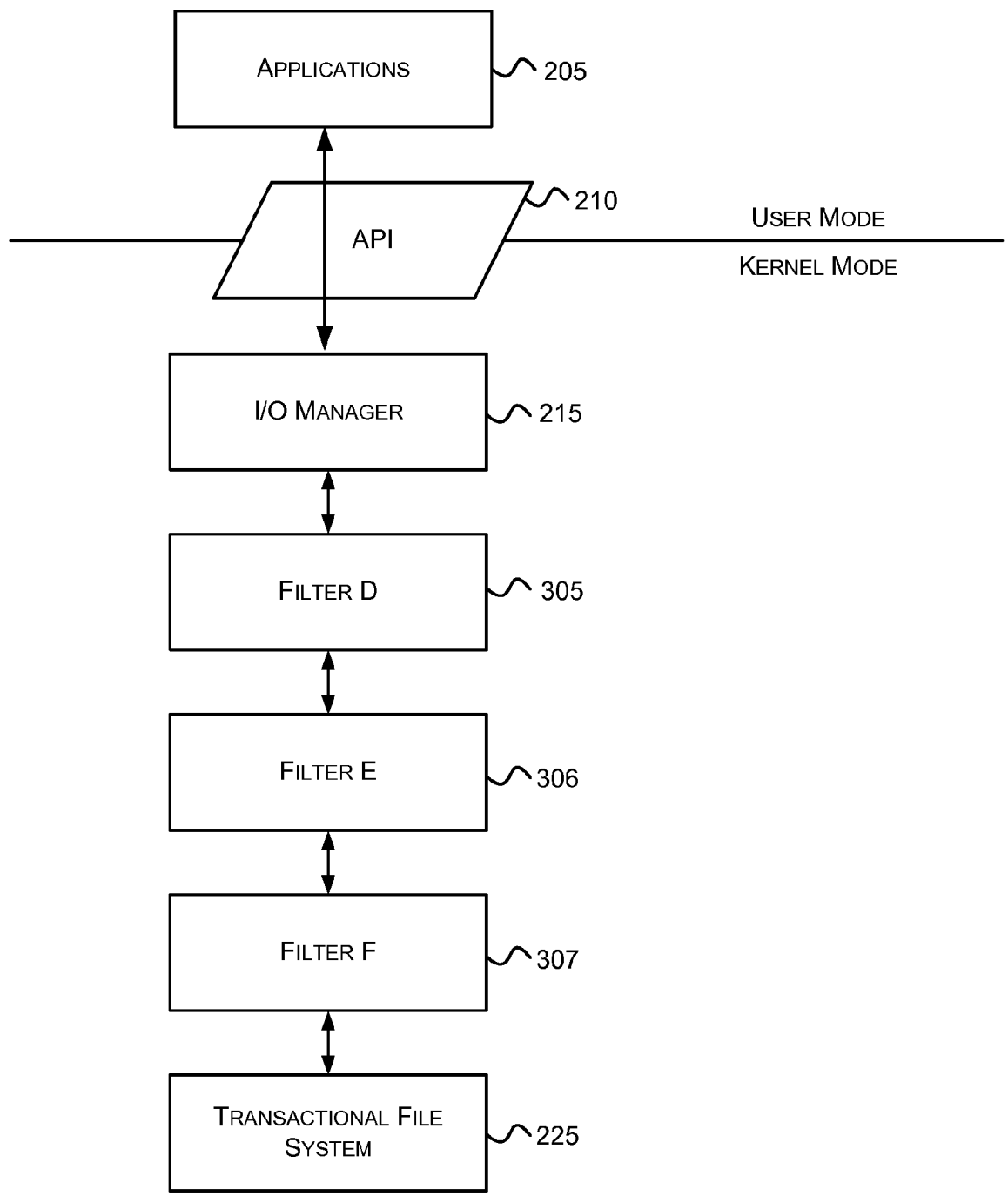
FIG. 3 is a block diagram representing another exemplary arrangement of components of a system that may operate in accordance with aspects of the subject matter described herein.

In one embodiment, filters may be arranged in a stacked manner as illustrated in FIG. 3, which is a block diagram representing another exemplary arrangement of components of a system that may operate in accordance with aspects of the subject matter described herein. In this embodiment, each of the filters 305-307 may process I/O requests and pass the requests (modified or unmodified) to another filter or other component in the stack. For example, in response to a read request received from one of the applications 205, the I/O manager 215 may issue an I/O request and send this request to the filter 305. The filter 305 may examine the I/O request and determine that the filter 305 is not interested in the I/O request and then pass the I/O request unchanged to the filter 306. The filter 306 may determine that the filter 306 will perform some action based on the I/O request and may then pass the I/O request (changed or unchanged) to the filter 307. The filter 307 may determine that the filter 307 is not interested in the I/O request and pass the I/O request to the transactional file system 225.

After the transactional file system 225 services the I/O request, it passes the results to the filter 307. Typically, the results pass in an order reverse from that in which the I/O request proceeded (e.g., first to filter 307, then to filter 306, and then to filter 305). Each of the filters 305-307 may examine the results, determine whether the filter is interested in the results, and may perform actions based thereon before passing the results (changed or unchanged) on to another filter or component.

Figure 4:
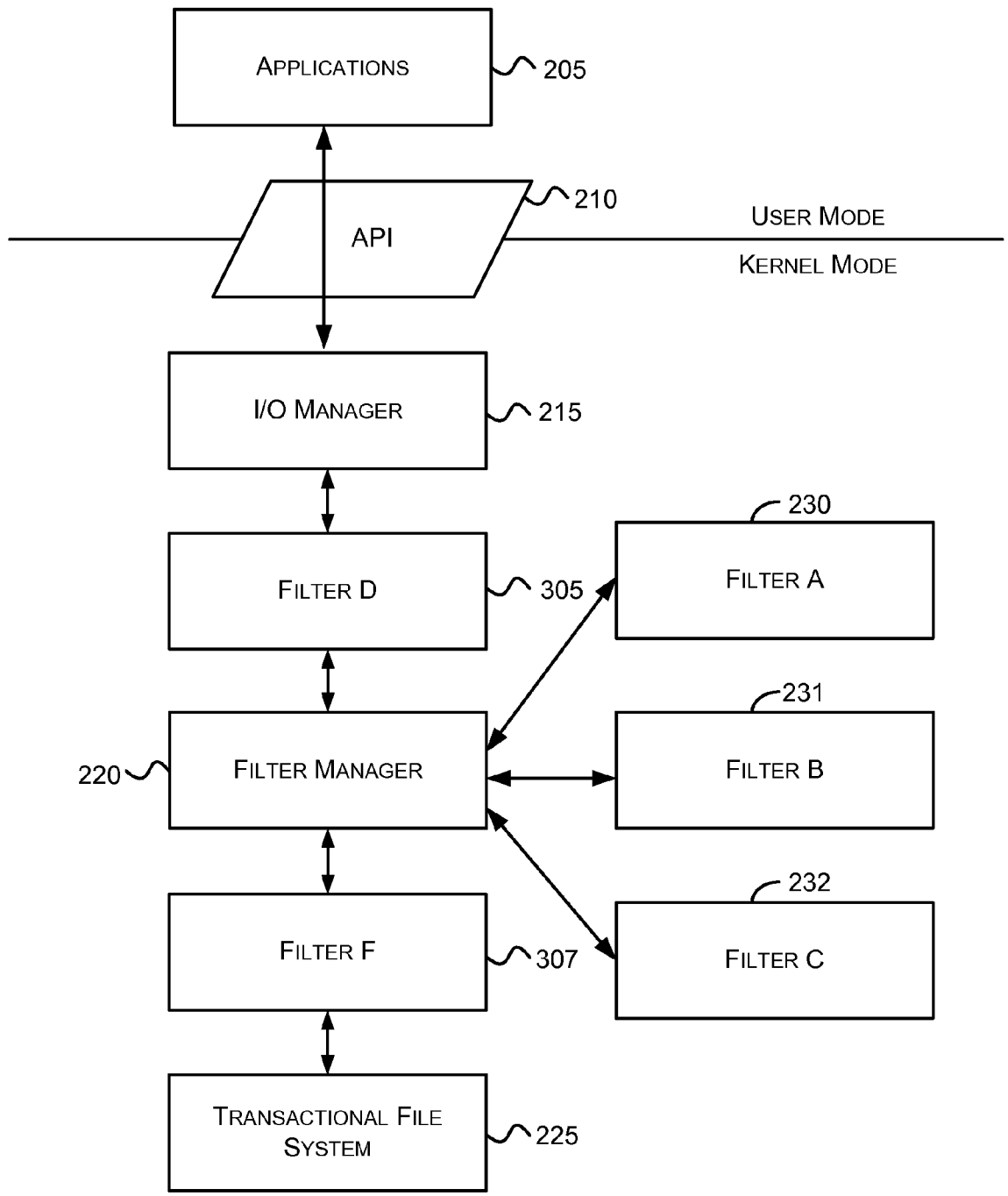
FIG. 4 which is a block diagram representing another exemplary arrangement of components of a system that may operate in accordance with aspects of the subject matter described herein.

In another embodiment, filters may be arranged in a stacked/managed manner as illustrated in FIG. 4, which is a block diagram representing another exemplary arrangement of components of a system that may operate in accordance with aspects of the subject matter described herein. In this configuration, some filters are associated with a filter manager while other filters are not. Filters that are associated with a filter manager (e.g., filters 230-232) are sometimes referred to herein as mini filters while filters that are not associated with a filter manager (e.g., filters 305 and 307) are sometimes referred to herein as legacy filters. The filter manager 220 is placed in a stack with other filters (e.g., filters 305 and 307).

It will be readily recognized that filters may be implemented in many other configurations without departing from the spirit or scope of aspects of the subject matter described herein. In some embodiments, a filter comprises any object that examines I/O between an application and a file system and that is capable of changing, completing, or aborting the I/O or performing other actions based thereon.

Returning to FIG. 2, the transactional file system 225 may operate on one or more volumes that may be located locally or remotely to the machine or machines upon which the applications 205 execute.

The transactional file system 225 comprises a mechanism for updating files inside or outside of transactions. Briefly, a process that is accessing an object within a transaction sees that object together with any changes made to the object within the transaction. Processes outside of the transaction do not see the changes made inside of the transaction unless the transaction commits. If a transaction rolls back (also known as "aborts"), the changes made within the transaction are undone and the object returns to its pre-transaction state.

Some transactional file systems allow save points. A save point allows all the files involved in a transaction to be rolled back to the state that existed when the save point was created (without aborting transaction). This may be useful, for example, if a routine called during a transaction makes changes to files involved in the transaction but fails. By restoring to a save point created just before the routine was called, any changes made by the routine may be reversed.

Transactions are well understood by those skilled in the art and will not be described in more detail here.

Quotas

An administrator or the like may desire to impose a quota on a directory or other file system object. A file system object may be a directory, file, some other file system object, and the like. A quota may indicate, among other things, an amount of storage (non-volatile and/or volatile storage) permitted to be consumed by the file system object or by a user. For a file system object that is a file, the quota may indicate how much storage the file is allowed to consume. For a file system object that is a directory, the quota may indicate how much storage may be consumed by all files and directories that are descendants of the directory. A descendant of a directory includes any subdirectories and files in the directory, subdirectories and files in those subdirectories, and so forth. For a user, the quota may indicate how much storage the user is allowed to consume.

A quota filter may enforce quotas on designated file system objects. Certain file system requests (e.g., renames and deletes) may change the file system namespace for the objects monitored by a filter. For example, a quota filter may be configured to enforce a quota of one gigabyte on an object called C:\DIR\QUOTA. The object's name and the quota applicable to the object may be stored in a metadata file which is persisted on non-volatile storage. An application may rename the object C:\DIR to C:\D or may move C:\DIR\QUOTA to C:\QUOTA. To continue enforcing the quota on the QUOTA object, the quota filter may monitor renames and update its metadata file each time a rename affects an object for which the quota filter is enforcing a quota.

In some operating systems, a rename operation may rename an object and/or move the object. Thus, by monitoring rename operations, a filter may capture either a name rename, a move of an object, or both. In operating systems in which renaming the file and moving the file are separate operations, a quota filter may need to monitor both of these operations to enforce quotas.

Figure 5:
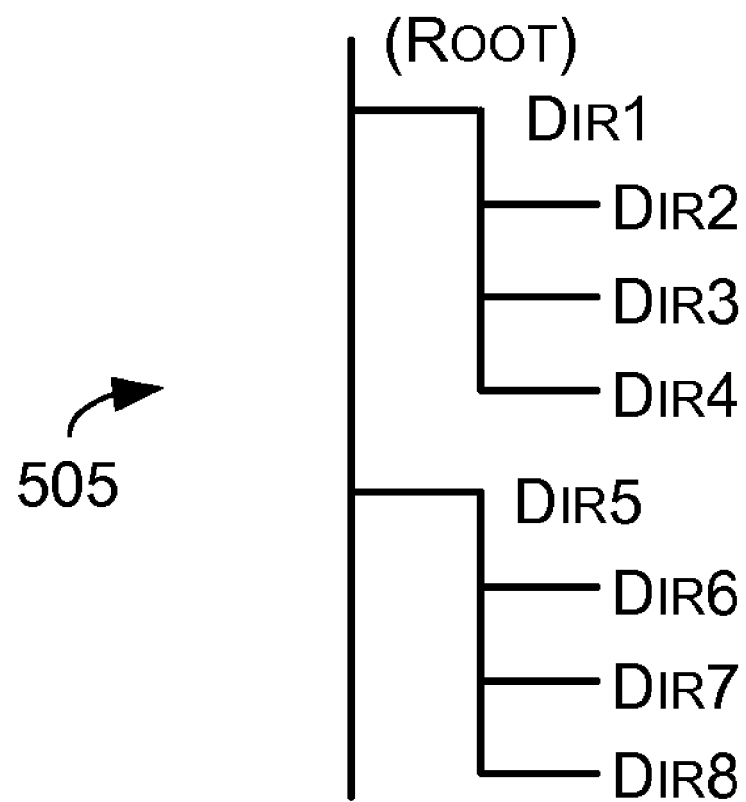
FIG. 5 is a diagram generally representing a portion of a directory structure of an exemplary file system in which aspects of the subject matter described herein may be practiced.

FIG. 5 is a diagram generally representing a portion of a directory structure of an exemplary file system in which aspects of the subject matter described herein may be practiced. The directory structure 505 includes a root directory which has subdirectories Dir1 and Dir5. The directory Dir1 has subdirectories Dir2, Dir3, and Dir4 while the directory Dir5 has subdirectories Dir6, Dir7, and Dir8.

Referring to FIG. 5, the administrator, for example, may set a quota on Dir1 of one megabyte. This means that the combined amount of space used by all descendant files and directories of Dir1 should not exceed one megabyte. For example if the files (not shown) in Dir2 consumed 500 kilobytes of space, the files (not shown) in Dir3 consumed 125 kilobytes of space, the files (not shown) in Dir4 consumed 125 kilobytes of space, and the overhead space to maintain the directories Dir1, Dir2, Dir3, and Dir4 consumed 4 kilobytes of space, the total remaining space before the quota is exceeded is 246 kilobytes.

A quota definition may include quota attributes and actions. Some exemplary quota attributes of a quota include size, directory name, thresholds, a high water mark that maintains the highest quota value charged, a high water time that indicates that last time the high water mark was updated, a last configuration time that indicates when the quota attributes were last modified, a quota tag that comprises a user-defined string that is associated with the quota, and the like. It will be recognized, however, that fewer, more, or other quota attributes may be included in a quota without departing from the spirit or scope of aspects of the subject matter described herein.

As mentioned previously, enforcing quotas becomes more complicated when dealing with a transaction-capable file system. This is in part because a file that is deleted or changed in one part of the transaction may be restored to its original state if the transaction aborts. Similarly, a file that is created during a transaction may be removed if the transaction aborts. Furthermore, entities outside of the transaction are not allowed to see changes made within the transaction until the transaction commits.

In accordance with aspects of the subject matter described herein, quota usage and quota charged are two separate but related concepts. Quota usage for a transaction is the amount of quota that would be used if the transaction were to commit at the time (e.g., just before) the quota usage is determined. For example, if within a transaction, a 10 MB file has been deleted and a 15 MB file has been added, quota usage after the file has been added is 5 MB.

Quota charge for a transaction indicates the maximum quota (i.e., worst case quota) that would be used by changes made within a transaction if the transaction were to commit, abort, or roll back to any save point at a time the quota charge is determined. For example, if a process deletes a 1 MB file during a transaction, quota charge after the delete but before a commit for the transaction would include the 1 MB as the transaction could abort. As another example, if a transaction has multiple save points where delta quota used at each save point is 1 MB, 10 MB, −6 MB, 5 MB, and 3 MB, and the current save point is 3 MB, quota charge for the transaction is 10 MB because the transaction could be rolled back to that save point and then committed. Barring extenuating circumstances, quota charge for a transaction should be greater than or equal to actual quota used within the transaction.

Note that quota usage for a transaction may be indicated by a delta amount that may be positive, zero, or negative. For example, it may be more computationally efficient to use delta amounts to calculate quota usage than to use absolute values. For example, if inside a transaction, a 1 MB file is extended to 4 MB, the delta quota usage for the transaction is 3 MB. As used herein, unless the context indicates otherwise, each time the phrase quota usage is used, in one embodiment it is to be replaced with the phrase delta quota usage while in another embodiment it is to remain as is.

Quota usage for a directory is the amount of quota used for the directory and any of its descendants outside of the context of any transaction. Thought of differently, quota used for the directory and all of its descendants is equivalent to the amount of disk space that the directories and its descendants would use if all transactions operating on the directory and its descendants were to roll back and then the disk space for the directory and its descendants was measured. For example, if a directory includes five files of 100 MB each (outside of transactions) the quota usage for the directory is 500 MB. Even if some of the files are involved in transactions, the quota usage for the directory is 500 MB.

Quota charge for a directory indicates quota used for the directory plus delta quota charge for each transaction that involves a descendent of the directory. For example, if two of the five files above were involved in transactions and one of the transactions had a delta quota charge of 10 MB and the other transaction had a delta quota charge of 20 MB, the quota charge for the directory is 530 MB.

The quota charge for a directory computed above may be enforced outside the context of any transaction and returned in usage queries outside of the context of any transaction. For example, a quota filter may fail I/O requests that would cause quota charge for a directory to exceed a quota allotment for the directory. As another example, if a process outside of a transaction affecting the directory queries for quota available, the quota allotment for the directory minus the quota charge for the directory may be returned.

In one embodiment, a threshold notification may be fired based on quota usage and/or quota charge. A threshold notification is a notification that indicates that a designated value (e.g., a percentage or absolute amount) of disk space (i.e., a "threshold" of disk space) has been exceeded. The notification may be sent to a process that provides notification to a system administrator or the like. Just because a threshold has been exceeded does not necessarily mean that further I/Os that increases quota usage or quota charge are failed as the threshold will almost always be set at a value less than the quota allotment.

Total quota used for a directory depends on whether it is used inside or outside of a transaction that might affect the quota charge of the directory. If the total quota used is queried outside of a transaction then it is equal to the quota charge for a directory. If the total quota used is queried inside of a transaction (e.g., T) that might affect the quota charge of the directory, the total quota used may be computed as the sum of:

1. The sum of quota charges for each transaction except T that affect the quota charge for a directory; and
2. The current quota usage for T.

The total quota used may be enforced inside the context of the transaction T and may be reported in usage queries inside the context of transaction T. For example, if the transaction T requests to extend or create a file and the total quota used exceeds the allotted quota, the request may be failed. If the transaction T queries for quota usage (e.g., to see how much quota is left), the total quota used as computed above may be returned.

In one embodiment, transaction metadata overhead may also be accounted for in quota usage and/or charge. Transactions involve some overhead to allow for rollbacks and crash recovery. For example, a change log may be stored that indicates changes made within the transaction. The change log may consume disk space if not placed in other non-volatile or volatile memory. The amount of disk space consumed by the metadata overhead may also be added to quota usage and/or charge.

In another embodiment, however, transaction metadata overhead is not accounted for in quota usage and/or charge.

To assist with describing tracking quota values in the presence of transaction, the following are defined:

1. Let N be the number of transactions.
2. Let $T_0$ be a non transaction.
3. Let $T_k$ be the $k^{th}$ transaction, $1 \leq k \leq N$.

A transactional file system may or may not support save points. When a transactional file system does not support save points or when there are no save points within any transactions, the following may be defined:

1. Let $S_0$ be the quota usage for a directory outside of any transactions.
2. Let $S_k$ be the quota usage for transaction $T_k$.
3. Let $D_k = S_k - S_0$ be the delta quota usage for the transaction $T_k$.

Then, the quota charge $Q_0$ for the directory is:

$$Q_0 = S_0 + \sum_{i=1}^{N} \max(0, D_i)$$

And the total quota used $Q_k$ seen within any transaction $T_k$ is:

$$Q_k = S_0 + D_k + \sum_{i=1(i \neq k)}^{N} \max(0, D_i), 1 \leq k \leq N$$

which may also be rewritten as:

$$Q_k = Q_0 + D_k - \max(0, D_k), 1 \leq k \leq N$$

When a transactional file system supports save points, the following may be defined:

1. Let $N_k$ be the number of save points for the transaction $T_k$.
2. Let $S_0$ be the quota usage for a directory outside of any transactions.
3. Let $S_{kj}$ be the quota usage for the transaction $T_k$ at the save point j.
4. Let $D_{kj} = S_k - S_0$ be the delta quota usage for the transaction $T_k$ at the save point j.

5. Let $\{D_k\}=\{D_{k1}, D_{k2}, \ldots\}$ be the delta quota usage of all the save points for the transaction $T_k$.

6. Let $D_k$ be the delta quota usage of the current save point for transaction $T_k$.

7. Let $W_k=\max(0, D_{k1}, D_{k2}, \ldots, D_k)$ be the worst case delta quota usage for transaction $T_k$.

Then, the quota charge $Q_0$ for the directory is:

$$Q_0 = S_0 + \sum_{i=1}^{N} W_i$$

And the total quota used $Q_k$ seen within any transaction $T_k$ is:

$$Q_k = S_0 + D_k + \sum_{i=1(i \neq k)}^{N} W_i, \ 1 \leq k \leq N$$

which may also be rewritten as:

$$Q_k = Q_0 + D_k - W_k, 1 \leq k \leq N$$

In one embodiment, to track quota usage/charge in the presence of transactions, a quota filter may use two variables. Variables as used herein may include simple variables such as scalar variables and more complex variables such a data structures. One of the variables (e.g., Value) tracks quota usage for the directory (e.g., outside of transactions). Another variable (e.g., TxValue) tracks quota usage a transaction that affects the quota charge of the directory. When a rollback to a save point occurs, the underlying file system is queried to determine the quota usage of the transaction. Below is some exemplary pseudo code:

```
//
// Value of the quota usage of the directory outside context of
any transaction
//
ULONGLONG Value;
//
// Contribution of transactions to the quota usage;
// At the start of the transaction, TxValue[1... N] = 0;
TxValueCharged[1...N] = 0;
// To be consistent with the formulas, the TxValue array starts
from index = 1.
// There are N transactions total.
//
LONGLONG TxValue[N];
ULONGLONG TxValueCharged[N];
//
// For each change outside of a transaction, quota usage outside of
the transaction
// is updated, where Update equals change in disk space used
//
Value += Update;
//
// For each change inside the transaction k, quota usage inside the
context of
// the transaction k is updated where Update equals change in
disk space used.
//
TxValue[k] += Update;
TxValueCharged[k] = Max( 0, TxValue[k] );
//
// In response to a query for quota usage outside the context of
any transaction.
// The sum is from transaction 1 to N.
//
return Value + Sum( TxValueCharged[i] )[i=1 to N];
```

```
//
// In response to a query for quota usage inside the context of the
transaction k.
//
return Value + Sum( TxValueCharged[i] )[i=1 to N, but i ≠ k] + TxValue[k];
//
// If the transaction k commits, the variables are updated.
//
Value = (Value + TxValue[k]);
TxValue[k] = 0;
TxValueCharged[k] = 0;
//
// If the transaction aborts, TxValue is updated while Value remains
unchanged
//
TxValue[k] = 0;
TxValueCharged[k] = 0;
//
// If the transaction rolls back to a save point, Value remains unchanged
// but TxValue is re-queried in the context of transaction k.
//
TxValue[k] = ReQueryFileSystem( );
TxValueCharged[k] = Max( 0, TxValue[k] );
```

Note that the size, N, of the TxValue array may be dynamically increased or decreased when a transaction that affects the quota charge of the directory is created, committed, or aborted.

In another embodiment, to track quota usage/charge in the presence of transactions without querying after rolling back to a save point, a quota filter may use other variables. One of the variables (e.g., Value) tracks quota usage for the directory outside of transactions. Another variable (e.g., TxValue) tracks quota usage of a transaction. The TxValue variable may comprise a data structure used to keep track of quota usage within the transaction at the various save points. This data structure may be used when a rollback to a save point occurs as well as being used to compute quota charge for a transaction. Below is some exemplary pseudo code:

```
//
// Value of the quota usage of the directory outside context of any
transaction
//
ULONGLONG Value;
//
// Contribution of transaction savepoints to the quota usage.
// At the start of the transaction for each TxValue, its savepointId = 0,
// savepointValue[...] = 0, valueCharged = 0.
// N indicates that there are N transactions total. TxValue[N] may be
an array,
// a linked list, or other dynamically allocated data structures.
// To be consistent with the formulas, the index of TxValue starts from 1.
// savepointValue[...] indicates the quota usage at various save points
for a transaction.
// The size of savepointValue[...] may be different for each TxValue.
It may be a dynamically
// allocated list or other data structures. Its index starts from 0.
//
Struct QUOTA_TX_VALUE {
    TRANSACTION_ID    transaction;
    ULONG             savepointId;
    ULONGLONG         valueCharged;
    LONGLONG          savepointValue[...];
    ......
};
QUOTA_TX_VALUE TxValue[N];
```

Below is some exemplary pseudo code to track quota usage/charge in the presence of transaction save points without querying after rolling back to a save point.

```
//
// For each change outside of a transaction, quota usage outside of the transaction
// is updated, where Update equals change in disk space used
//
Value += Update;
//
// For each change inside the transaction, quota usage inside the context of the transaction k
// is updated where Update equals change in disk space used.
// Let m = TxValue[k].savepointId
//
TxValue[k].savepointValue[m] += Update;
TxValue[k].valueCharged = Max( 0, TxValue[k].savepointValue[0...m] );
//
// In response to a query for quota usage outside the context of any transaction.
//
return Value + Sum( TxValue[i].valueCharged )$_{[i=1\ to\ N]}$;
//
// In response to a query for quota usage inside the context of the transaction k.
// Let m = TxValue[k].savepointId
//
return Value + Sum(TxValue[i].valueCharged)$_{[i=1\ to\ N,\ but\ i\ =\ k]}$ +
TxValue[k].savepointValue[m];
//
// If the transaction k commits, the variables are updated
// Let m = TxValue[k].savepointId
//
Value += TxValue[k].savepointValue[m];
TxValue[k].savepointValue[...] = 0;
TxValue[k].valueCharged = 0;
TxValue[k].savepointId = 0;
// TxValue[k] may be freed or used to represent quota usage for another transaction.
//
// If the transaction k aborts, Value remains unchanged.
//
TxValue[k].savepointValue[...] = 0;
TxValue[k].valueCharged = 0;
TxValue[k].savepointId = 0;
// TxValue[k] may be freed or used to represent quota usage for another transaction.
//
// If a new save point is created for the transaction k, TxValue is updated
// Let m = TxValue[k].savepointId
// TxValue[k].savepointValue[...] may need to be reallocated to increase its size.
//
TxValue[k].savepointValue[m+1] = TxValue[k].savepointValue[m];
TxValue[k].savePointId ++;
//
// If the transaction k rolls back to a save point s, then TxValue is updated
// Let m = TxValue[k].savepointId
//
TxValue[k].savepointValue[s+1...m] = 0;
TxValue[k].valueCharged = Max( 0, TxValue[k].savepointValue[0...s] );
TxValue[k].savePointId = s;
```

The method indicated by the pseudo code above may be used to track values of quota usage at several save points at the same time or those whose value cannot be easily discovered (e.g., via a query to the file system) when a transaction rolls back to a save point.

When an update to a file within a transaction occurs, a quota filter may first attempt to find a control data structure associated with the transaction. This data structure may include a transaction ID, a quota charge field, a quota used field, which is a list of quota usage for the transaction save points, and other fields as desired. If the data structure is not present, the quota filter may allocate space for the data structure and initialize the data structure. As discussed previously, the quota charge field indicates the worst case quota a transaction could use at a particular point in time considering that the transaction could commit, abort, or rollback to a save point. The quota used field may be a list of quota save points as defined above, or other similar data structure. After finding or creating the control data structure, the quota filter may then update the quota used field inside the data structure. Using the list of quota used field, the quota charged for the transaction may be computed as the maximum of zero and the largest value in the quota used list.

To enforce a quota, the quota allocated is compared against total quota used which may be represented by a variable (e.g., TotalQuotaUsed). If allowing the I/O to complete would cause the total quota used to be greater than the quota allocated, an I/O may be failed and/or a notification sent. The total quota used in the context of transaction "T" may be computed as follows:

```
//
// First initialize to quota usage outside the context of any transaction,
// then calculate the quota usage in the context of transaction T.
//
QUOTA_TX_VALUE TxValue;
ULONGLONG TotalQuotaUsed = Value;
For each TxValue for a transaction
    if (TxValue.transaction == T) {
```

```
    //
    // Add the current quota usage for this transaction
    //
    TotalQuotaUsed += TxValue.savepointValue[TxValue.savepointId];
  } else {
    //
    // Add the worst case quota usage for other transaction
    //
    TotalQuotaUsed += TxValue.valueCharged;
  }
}
return TotalQuotaUsed;
```

The TotalQuotaUsed as computed above is also the quota usage that will be reported by the filter in the context of transaction "T" for the quota policy.

The computation of total quota used for a directory outside the context of any transaction may be computed by following the same algorithm with T=NULL.

Updates and Quota Scanning when Rebuilding Quotas

Sometimes quota data structures may need to be built or rebuilt. For example, when a quota policy is applied to a new directory, the quota data structures associated with the new directory may need to be built. As another example, if the quota data structures become corrupted, they may need to be rebuilt.

In rebuilding or building quota data structures, a scanner may scan files in affected directories (i.e., directories that are associated with a quota policy). If during the scan, the quota filter sees any I/O in the context of a transaction on a file affected by a quota policy that is being rebuilt and that file has not yet been completely accounted for in the quota charge for that quota policy, the file will be completely accounted for and the quota policy data structure will be marked to indicate that the file is accounted for.

In one embodiment, quota scanning will scan a file outside the context of any transaction and in the context of the locking transaction. The quota charge for that file outside the context of any transaction will be used to update a variable (e.g., QuotaCharge) in the file context structure and correspondingly the total quota used field for the quota being scanned. A file context is a data structure used by the quota filter to track the quota usage per file.

The quota charge for that file in the context of the locking transaction will be used to update the QuotaCharge in the file context structure and correspondingly the savepointValue field in the TxValue for that transaction. The quota charge may be attributed to save point 0 for the transaction. Note that this is may not reflect the actual usage of the file but at least will not be less than what the file is using. Any discrepancy can be reconciled when the transaction commits (sometimes referred to as "reconciliation at commit") because at that time the filter has enough information to reconcile the charge as tracked by the filter with the real charge after commit has completed.

If the transaction rolls back to a save point the quota usage attributed to the transaction may not be accurate because all the transacted quota charge for the file may have been attributed to save point 0. If more accuracy is desired, the "reconciliation at commit" described above may be performed at rollbacks for any file whose quota charge has been scanned in a transaction context. In one embodiment, there may not be reconciliation at every rollback. In another embodiment, there may be reconciliation at every rollback.

If a file that is being examined by the quota scanner is locked by a transaction, the file context and stream contexts for that file are added to the corresponding list (file or stream) in the transaction context for that transaction if it is not already present in that list. Any discrepancies in the quota charge due to I/O on the file in the context of the transaction may be reconciled when the transaction commits.

Some file systems support multiple steams of data within the same file. A filter can associate a context (e.g., a data object) with a particular stream of the file that it is interested in (e.g., one that was modified in the context of the transaction) and also a context with the file to which the stream belongs. In such file systems, the stream context may include information about a specific data stream of the file, similarly to how a file context includes data about the entire file. Data relating to quota usage for a data stream may be stored in the stream context while data relating to quota usage for the file may be stored in the file context.

The approach described above may depend on the ability to query allocation for the file inside and outside of the transaction and on the premise that the allocation as returned by the file system outside the context of any transaction is allocation for the file if the transaction was aborted. If a file system does not provide this support, it may be modified to do so or the filter may be modified to reconcile quota charge on transaction abort along the same lines as transaction commit.

The approach above may use the ability to enumerate objects in a directory in global context, that is, an enumeration that returns transacted and non-transacted directory entries in the enumeration.

Renames

When a directory is renamed outside a transaction, the quota filter may calculate the quota charge for the directory by creating a temporary quota for the directory and synchronously scanning the directory to compute quota usage. When a directory is renamed inside a transaction 'T', the computation for the quota charge for the directory may be calculated as the sum of the quota usage for that directory outside the context of any transaction and the quota usage for that directory in the context of transaction 'T'.

If there is a quota usage for that directory in the context of any transaction other than 'T' then the rename may fail. For example, in some transactional file systems, it may be impermissible to rename a directory when a descendant of the directory is being modified in the context of a transaction different than 'T'.

Quota Metadata File Updates

In one embodiment, a quota filter may update the quota usage in a quota metadata file when it updates the QuotaUsed field for a quota policy. This may cause the quota usage in the quota metadata file to not include any quota used within a transaction. When the transaction commits, however, the quota usage in the quota metadata file may be updated.

In another embodiment, a quota filter may keep track of transacted quota usage in a quota metadata file and update this usage when there is a change in the quota used in the context of a transaction. In this embodiment, the quota usage in the quota metadata file does include the quota used within a transaction.

For crash recovery, a quota control record may be marked as dirty (e.g., using a reference counter) by a transaction that affects it. In case of a crash, dirty quota control records may cause a quota rescan and rebuilding of quota data structures.

Quota Accounting for Transaction Metadata

As mentioned previously, transactions may consume additional disk space in the form of a change log or otherwise. In one embodiment, this overhead may be charged to a quota by determining quota charge for the metadata after every I/O that could affect the quota charge for a file. This may be done by querying the underlying file system for space consumed by metadata associated with the file after each I/O that could affect that space. Note that there are I/O operations such as in-place writes that may not affect the size of the file but that do modify the transaction file space overhead for the file.

Processing Transaction Notifications

If a quota filter sees an I/O in the context of a transaction that will affect the quota charge for a quota policy, the quota filter may set up a transaction context for that transaction and enlist in the transaction in the pre-operation callback for that I/O. The transaction context may include quota data structures related to the transaction. Each time an I/O related to the transaction occurs, the transaction context may be provided to or retrieved by the quota filter. If enlisting in the transaction fails then the filter may fail the I/O.

The quota filter may register for rollback and commit complete notifications. In addition, the quota filter may monitor I/O to the volume for file system control commands (FSCTLs) that set save points and rollback transactions to save points. The filter may discover the current save point for the transaction by querying the file system and initializing the CurrentSavepoint field in the transaction context.

When a quota filter receives a commit complete notification, the quota filter may perform the following actions:

1. Traverse the quota transaction data structures in the transaction context and update them appropriately.

2. Traverse the quota stream contexts in the transaction context and update each quota stream context appropriately. For example, the stream context may include information such as the allocation size for the stream-both outside the context of any transaction and in the context of the locking transaction. The allocation size may be updated when the transaction commits or aborts.

3. Traverse the quota file contexts in the transaction context. The quota file contexts may comprise a list of file contexts associated with files that have been modified inside the transaction. For each quota file context structure do the following:

a. Update the structure appropriately (e.g., in accordance with the equations and algorithms provided previously).

b. Re-compute the quota charge for the file outside the context of any transaction.

c. If the quota charge computed in 3-b above does not match the quota charge as deduced at the end of 3-a, update the data structures that are affected by this file appropriately to reflect the missed charge.

4. Tear down the structures that are associated with the transaction.

When a quota filter receives an abort complete notification, the quota filter may perform the following actions:

1. Traverse the quota transactions data structures in the transaction context and update them appropriately.

2. Traverse the quota stream contexts in the transaction context and update each quota stream context appropriately (e.g., update allocation size).

3. Traverse the quota file contexts in the transaction context and update each quota file context appropriately (e.g., in accordance with the equations and algorithms described previously). If a list of quotas affected by the file was refreshed for a transacted rename or hard link operation, then rebuild the list of quotas.

A transactional file system may allow a "hard link." A hard link is a link to a file that physically exists in one location in the file system. The hard link makes it appear to various processes as if the file exists in two places with the same name or a different name. For example, a file FILE1 in the directory \DIR1 may be hard linked to a file FILE2 in the directory \DIR2. Changing FILE2 changes FILE1 and changing FILE1 changes FILE2 as they are really both the same file. There may be more than one hard link to a file.

In one embodiment, for quota-accounting purposes a hard link is treated as if the file linked to by the hard link existed as a separate copy in the hard link location. This may cause a hard linked file to be double-counted when accounting for quota used. For example, if FILE1 exists in \DIR1\DIR2 and a hard link (e.g., FILE2) to the file exists in \IR1, the space used by FILE1 may be double-counted in determining quota usage for a quota applied to \DIR1. In another embodiment, however, a hard linked file may only be accounted for once in quota accounting.

4. Tear down the structures that are associated with the transaction.

When the quota filter sees an FSCTL to set a save point for a transaction, the quota filter may perform the following actions:

1. Update the current save point in the transaction context.

2. Traverse each quota transactions data structure associated with the transaction context and update it appropriately.

3. Traverse the quota stream contexts in the transaction context and update each quota stream context appropriately (e.g., update allocation size).

4. Traverse the quota file contexts in the transaction context and update each quota file context appropriately (e.g., in accordance with the equations and algorithms described previously).

When the quota filter sees a FSCTL that rolls the transaction back to a save point, the quota filter may perform the following actions:

1. Update the current save point in the transaction context.

2. Traverse each quota transaction data structure associated with the transaction context and update it appropriately.

3. Traverse each quota stream context associated with the transaction context and update it appropriately (e.g., update allocation size).

4. Traverse each quota file context associated with the transaction context and update it appropriately (e.g., in accordance with the equations and algorithms described previously). Some fields in the file context may need to be updated by re-querying the values from the file system in the context of the transaction. If a list of quotas affected by a file was refreshed for a transacted rename or hard link operation, then rebuild the list.

In one embodiment, updates to a file may occur in the context of a single locking transaction. In other words, a file may not be modified by two transactions concurrently. The quota filter may validate this assumption through ASSERTs which verify that the updates to the transaction specific fields of quota data structures only occur in the context of the locking transaction.

Figure 6:
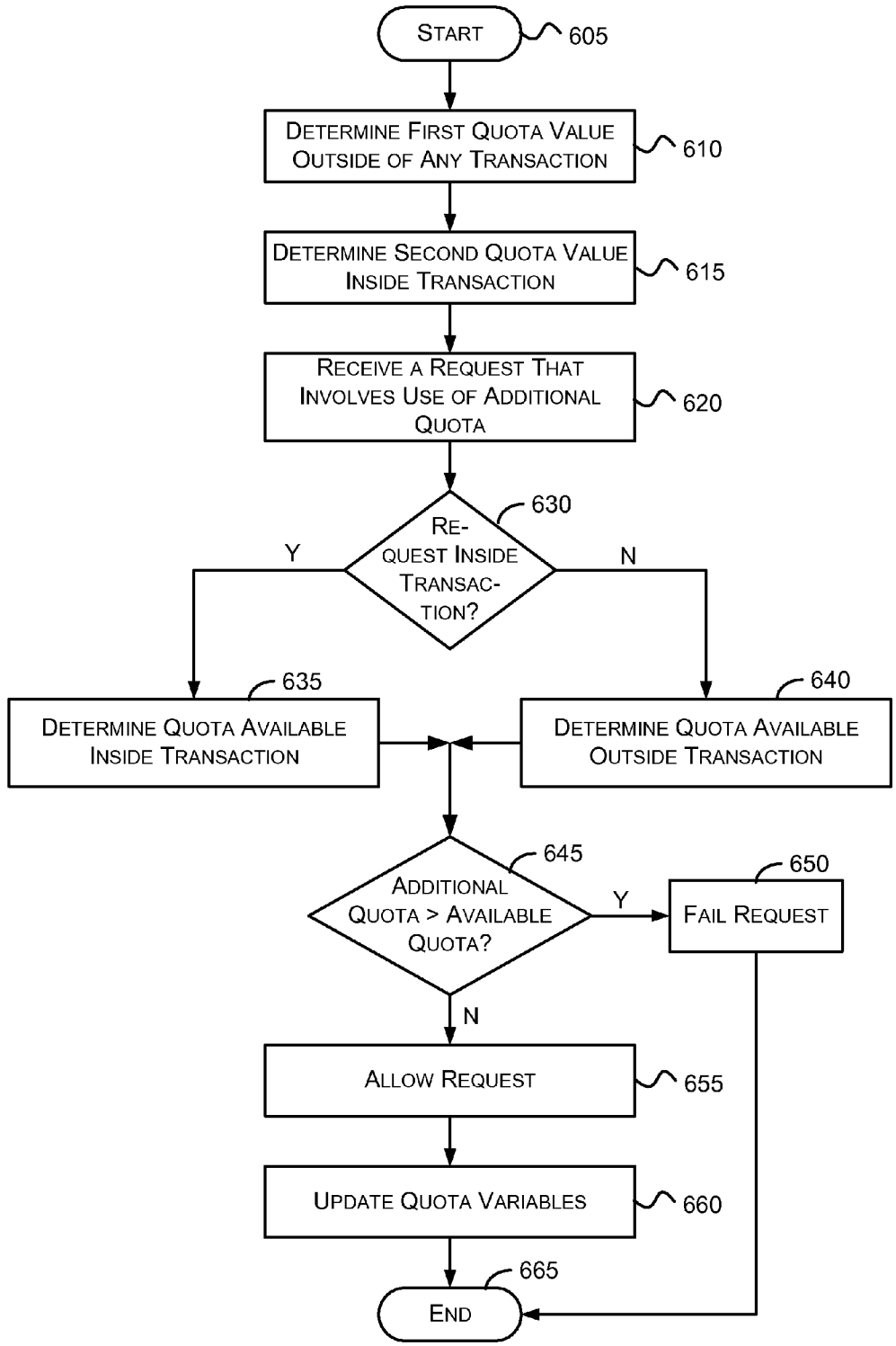
FIG. 6 is a flow diagram that generally represents exemplary actions that may occur in enforcing a quota on a file system object in accordance with aspects of the subject matter described herein.
Figure 7:
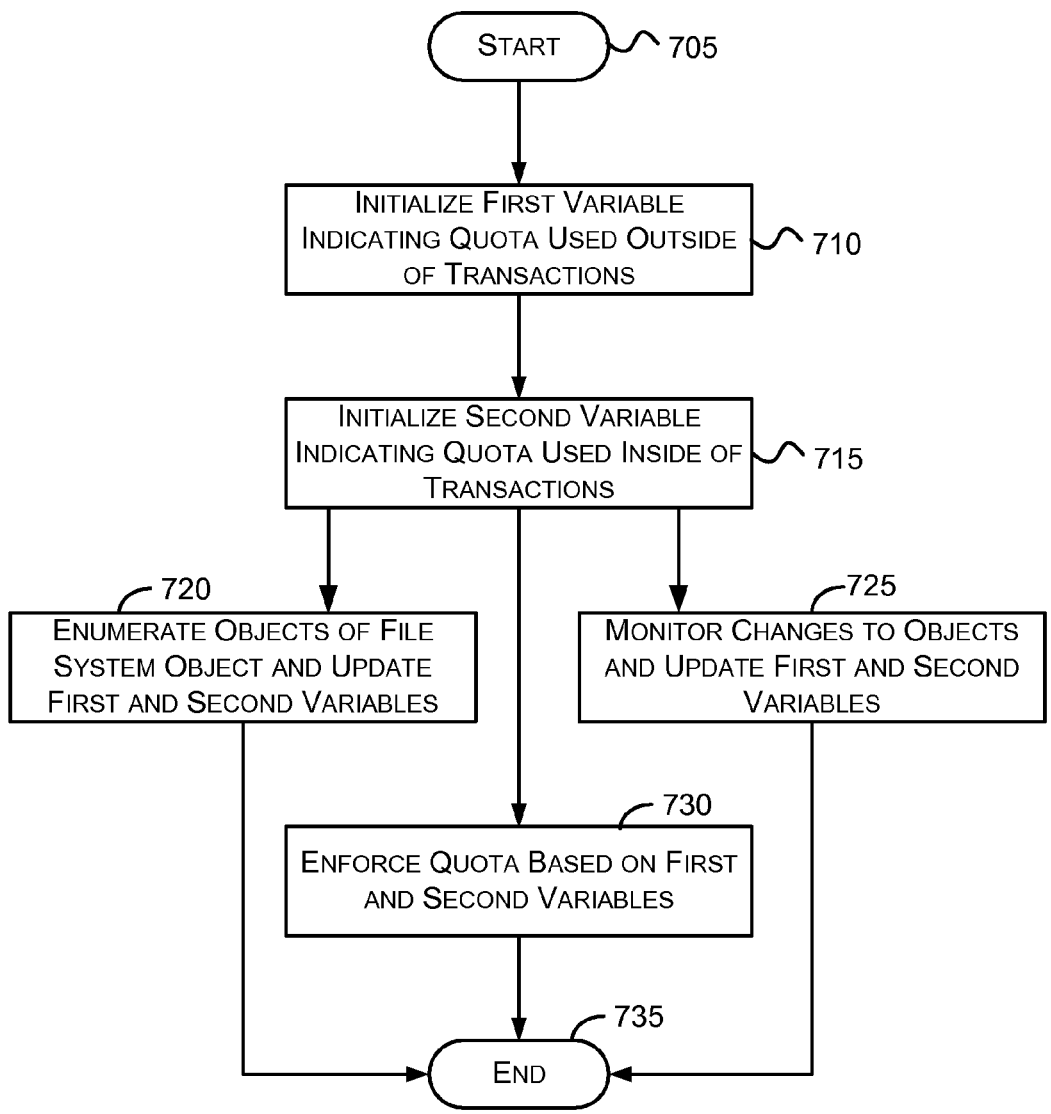
FIG. 7 is a flow diagram that generally represents exemplary actions that may occur in creating quota data structures in accordance with aspects of the subject matter described herein.

FIGS. 6-7 are a flow diagram that generally represents exemplary actions that may occur in accordance with aspects of the subject matter described herein. For simplicity of explanation, the methodology described in conjunction with FIGS. 6 and 7 is depicted and described as a series of acts. It is to be understood and appreciated that aspects of the subject matter described herein are not limited by the acts illustrated and/or by the order of acts. In one embodiment, the acts occur in an order as described below. In other embodiments, however, the acts may occur in parallel, in another order, and/or with other acts not presented and described herein. Furthermore, not all illustrated acts may be required to implement the methodology in accordance with aspects of the subject matter described herein. In addition, those skilled in the art will understand and appreciate that the methodology could alternatively be represented as a series of interrelated states via a state diagram or as events.

FIG. 6 is a flow diagram that generally represents exemplary actions that may occur in enforcing a quota on a file system object in accordance with aspects of the subject matter described herein. At block 605, the actions begin. At block 610, a quota value outside of any transaction is determined. For example, a quota filter may determine the quota used for a directory.

At block 615, a second quota value inside of a transaction is determined. For example, a quota filter may determine the quota used/charged within a transaction.

At block 620, a request that involves the use of additional quota is received. For example, a quota filter may receive a request to extend a file of a directory that has a particular quota allocation.

At block 630, a determination is made as to whether the request is inside or outside of a transaction. If it is inside, the actions continue at block 635; otherwise, the actions continue at block 640.

At block 635, a quota filter may determine the quota available within the transaction. For example, the quota filter may determine the total quota used within the transaction as described previously.

At block 640, the quota filter may determine the quota available outside the transaction. For example, the quota filter may determine the quota charge of a directory.

At block 645, a determination is made as to whether the additional quota needed to satisfy the request is greater than the available quota. If so, the actions continue at block 650; otherwise, the actions continue at block 655.

At block 650, the request is failed as the additional quota needed to satisfy the request does or might exceed quota allotted. The additional quota might exceed the quota allotted even though the quota used (even with the request) does not exceed the allotted quota if a transaction rolls back to a save point or aborts, for example.

At block 655, the request is allowed. For example, the quota filter allows the request to proceed towards the file system.

At block 660, quota variables are updated as described previously. For example, after the change has occurred, variables associated with quota inside and/or outside of transactions may be updated.

At block 665, the actions end. If a subsequent request is received for the same file system object, the actions described above may be repeated.

FIG. 7 is a flow diagram that generally represents exemplary actions that may occur in creating quota data structures in accordance with aspects of the subject matter described herein. At block 710, the actions begin.

At block 710, a first variable (e.g., scalar value or data structure) is initialized to indicate quota used outside of transactions for a particular file system object. For example, a quota filter may initialize a Value variable to zero in preparation for scanning the directory to update quota use/charge associated with the directory.

At block 715, a second variable (e.g., scalar value or data structure) is initialized to indicate quota used inside a transaction. For example, a quota filter may find an object in the directory that is affected by a transaction. The quota filter may initialize this second variable as described previously.

At blocks 720, the objects of the file system object are enumerated and the first and second variables are updated appropriately. For example, quota used by objects outside of transactions may be used to update the first variable while quoted used/charged by objects inside transactions may be used to update the second variable.

At block 725, the quota filter monitors changes to objects and continues to update the first and second variables as described previously. For example, if the quota filter detects a change to a non-transacted file, the quota filter may update the first variable. If the quota filter detects a change to a transacted file, the quota filter may update the second variable.

At block 730, a quota is enforced on the file system object based on the first and second variables. For example, the quota filter may determine total quota used for a directory and may allow or fail requests for additional quota usage as described previously.

At block 735, the actions end.

Note that in one embodiment, the actions associated with blocks 720, 725, and 730 are explicitly noted as may be occurring in parallel. It may be desired to enforce a quota (as much as possible) while rebuilding quota structures. In other embodiments, the actions associated with one or more of these blocks may occur sequentially and/or in a loop.

As can be seen from the foregoing detailed description, aspects have been described related to quota enforcement in transactional file systems. While aspects of the subject matter described herein are susceptible to various modifications and alternative constructions, certain illustrated embodiments thereof are shown in the drawings and have been described above in detail. It should be understood, however, that there is no intention to limit aspects of the claimed subject matter to the specific forms disclosed, but on the contrary, the intention is to cover all modifications, alternative constructions, and equivalents falling within the spirit and scope of various aspects of the subject matter described herein.

What is claimed is:

1. A computer storage medium having computer-executable instructions recorded thereon, which when executed perform actions, comprising:

determining, for a file system directory having a quota allotment representing an amount of storage that is permitted to be consumed by the file system directory, a first quota value representing an amount of the quota allotment used by the file system directory outside of any transaction;

determining, for the file system directory, a second quota value in association with a transaction that has not yet committed wherein the second quota value comprises an amount of the quota allotment that would be used by the transaction that has not yet committed if the transaction that has not yet committed were to commit at a time of determining the second quota value;

receiving a request that involves use of an additional amount of the quota allotment;

responsive to determining that the request is made outside of a transaction, determining whether quota is available to satisfy the request by calculating a quota charge of the file system directory, wherein the quota charge of the file system directory is equal to the first quota value plus a quota charge for each transaction that involves a descendant of the file system directory, wherein the quota charge for a transaction indicates the maximum quota that would be used by changes made within the transaction if the transaction were to commit, abort or roll back to any save point at a time the quota charge for the transaction is determined;

responsive to determining that the request is made inside of the transaction that has not yet committed, determining whether quota is available to satisfy the request by adding the second quota value to a sum of quota charges for each transaction except the transaction that has not yet committed that affects the quota charge for the file system directory; and failing the request if a sum of the quota charge of the file system directory and the additional amount of the quota allotment is greater than the quota allotment and the request is made outside of a transaction.

2. The computer storage medium of claim 1, wherein determining the first quota value comprises determining disk space used by one or more objects outside of any transaction modifications, the one or more objects being descendants of the file system directory.

3. The computer storage medium of claim 1, wherein determining the second quota value in association with the transaction that has not yet committed comprises computing a delta quota used by the transaction that has not yet committed.

4. The computer storage medium of claim 3, wherein the delta quota used may be positive, negative, or zero.

5. The computer storage medium of claim 1, wherein the actions further comprise failing the request if a sum of the additional amount of the quota allotment and the result of adding the second quota value to the sum of quota charges for each transaction except the transaction that has not yet committed that affects the quota charge for the file system directory is greater than the quota allotment and the request is made inside of the transaction that has not yet committed.

6. The computer storage medium of claim 1, wherein determining the second quota value in association with the transaction that has not yet committed further comprises determining overhead disk space used in connection with the transaction that has not yet committed.

7. The computer storage medium of claim 1, wherein determining the second quota value in association with the transaction that has not yet committed further comprises ignoring overhead disk space used in connection with the transaction that has not yet committed.

8. The computer storage medium of claim 1, wherein determining whether quota is available to satisfy the request comprises comparing the quota allotment with a sum of the additional amount of the quota allotment and one of the quota charge of the file system directory or the result of adding the second quota value to the sum of quota charges for each transaction except the transaction that has not yet committed that affects the quota charge for the file system directory.

9. A method implemented at least in part by a computer, the method comprising:
   initializing a first variable that indicates quota used by a directory outside of any transaction;
   initializing a second variable that indicates quota used by the directory inside of a transaction that has not yet committed;
   enumerating objects of a file system to obtain quota used via the objects and updating the first and second variables as the enumerating proceeds;
   monitoring changes to objects of the file system both inside and outside of transactions and updating one or more of the first and second variables as each change completes; and
   enforcing a quota allotment based on the first and second variables, wherein enforcing the quota allotment comprises:
      receiving a request that involves using an additional amount of the quota allotment;
      responsive to determining that the request is outside of a transaction, determining whether quota is available to satisfy the request by calculating a quota charge of the directory, wherein the quota charge of the directory is equal to the value of the first variable plus a quota charge for each transaction that involves a descendent of the directory, wherein the quota charge for a transaction indicates the maximum quota that would be used by changes made within the transaction if the transaction were to commit, abort or roll back to any save point at a time the quota charge for the transaction is determined;
      responsive to determining that the request is inside of a transaction that has not yet committed, determining whether quota is available to satisfy the request by adding the value of the second variable to a sum of quota charges for each transaction except the transaction that has not yet committed that affects the quota charge for the directory; and
      failing the request if a sum of the quota charge of the directory and the additional amount of the quota allotment is greater than the quota allotment and the request is outside of a transaction.

10. The method of claim 9, wherein a change completes inside a transaction when the change commits, aborts, or rolls back to a save point.

11. The method of claim 9, wherein a change completes outside of a transaction when the file system indicates that the change has completed.

12. The method of claim 9, wherein monitoring changes to objects of the file system both inside and outside of transactions comprises monitoring deletes, renames, and writes associated with the objects.

13. The method of claim 9, wherein enumerating objects of a file system to obtain quota used comprises enumerating objects that are within and outside of transactions in a single enumeration.

14. An apparatus, comprising:
   a processing unit; and
   a memory connected to the processing unit that stores:
   a file system that is executed by the processing unit and is capable of operating on a directory within the file system via a transaction that has not yet committed,
   a process that is executed by the processing unit to request access to the directory inside, outside, or both inside and outside of the transaction that has not yet committed, and
   a filter that is executed by the processing unit to examine selected communication between the file system and the process, to track a first quota value representing an amount of a quota allotment used by the directory outside of any transaction and a second quota value representing an amount of the quota allotment that would be used by the transaction that has not yet committed if the transaction that has not yet committed were to commit at a time of determining the second quota value, and to enforce a quota on the directory based on one or more of the first quota value, the second quota value and the quota allotment, wherein enforcing the quota on the directory comprises:
      receiving a request that involves using an additional amount of the quota allotment;

responsive to determining that the request is outside of a transaction, determining whether quota is available to satisfy the request by calculating a quota charge of the directory, wherein the quota charge of the directory is equal to the first quota value plus a quota charge for each transaction that involves a descendent of the directory, wherein the quota charge for a transaction indicates the maximum quota that would be used by changes made within the transaction if the transaction were to commit, abort or roll back to any save point at a time the quota charge for the transaction is determined; and responsive to determining that the request is inside of the transaction that has not yet committed, determining whether quota is available to satisfy the request by adding the second quota value to a sum of quota charges for each transaction except the transaction that has not yet committed that affects the quota charge for the directory; and failing the request if a sum of the quota charge of the directory and the additional amount of the quota allotment is greater than the quota allotment and the request is outside of a transaction.

15. The apparatus of claim 14, wherein enforcing the quota on the directory further comprises failing the request if a sum of the additional amount of the quota allotment and the result of adding the second quota value to the sum of quota charges for each transaction except the transaction that has not yet committed that affects the quota charge for the directory is greater than the quota allotment and the request is made inside of the transaction that has not yet committed.

* * * * *